United States Patent
Wang et al.

(10) Patent No.: US 10,301,119 B2
(45) Date of Patent: May 28, 2019

(54) ROLLING DEVICE, PACKAGE FOR ROLLING DEVICE, AND ROLLING MODULE

(71) Applicant: FIVETECH TECHNOLOGY INC., New Taipei (TW)

(72) Inventors: Ting-Jui Wang, New Taipei (TW); Sin-Yu Yang, New Taipei (TW)

(73) Assignee: FIVETECH TECHNOLOGY INC. (TW)

( * ) Notice: Subject to any disclaimer, the term of this patent is extended or adjusted under 35 U.S.C. 154(b) by 58 days.

(21) Appl. No.: 15/586,669

(22) Filed: May 4, 2017

(65) Prior Publication Data

US 2017/0320674 A1    Nov. 9, 2017

(30) Foreign Application Priority Data

May 6, 2016    (TW) .............. 105206525 U

(51) Int. Cl.

| | |
|---|---|
| B65G 39/00 | (2006.01) |
| B65G 39/02 | (2006.01) |
| B65G 39/12 | (2006.01) |
| B65D 25/10 | (2006.01) |
| B65D 85/68 | (2006.01) |
| B65G 13/00 | (2006.01) |
| F16C 43/04 | (2006.01) |
| F16C 29/04 | (2006.01) |
| F16C 41/04 | (2006.01) |
| F16C 29/00 | (2006.01) |

(52) U.S. Cl.
CPC ........... *B65G 39/025* (2013.01); *B65D 25/10* (2013.01); *B65D 85/68* (2013.01); *B65G 13/00* (2013.01); *F16C 29/046* (2013.01); *F16C 43/04* (2013.01); *F16C 29/004* (2013.01); *F16C 41/04* (2013.01)

(58) Field of Classification Search
None
See application file for complete search history.

(56) References Cited

U.S. PATENT DOCUMENTS

| | | | | |
|---|---|---|---|---|
| 4,946,294 A | * | 8/1990 | Yamada | B65G 7/04 |
| | | | | 193/35 MD |
| 2010/0065400 A1 | * | 3/2010 | Pruett | B65G 39/025 |
| | | | | 193/35 MD |

* cited by examiner

*Primary Examiner* — Kavel Singh
(74) *Attorney, Agent, or Firm* — Schmeiser, Olsen & Watts, LLP

(57) ABSTRACT

A rolling device, a package for rolling device and a rolling module are introduced. The rolling device includes a receiving seat defining a receiving recess, at least one secondary rolling member received in the receiving recess to contact with a surface of the receiving recess, a primary rolling member partially received in the receiving recess to contact with a surface of the at least one secondary rolling member, a coupling section connected to the receiving seat for coupling to an external object, and a stop section connected to the receiving seat and defining a stop opening, which has a size smaller than a maximum size of the primary rolling member.

23 Claims, 10 Drawing Sheets

ROLLING DEVICE, PACKAGE FOR ROLLING DEVICE, AND ROLLING MODULE

CROSS-REFERENCE TO RELATED APPLICATION

This non-provisional application claims priority under 35 U.S.C. § 119(a) on Patent Application No(s). 105206525 filed in Taiwan, R.O.C. on May 6, 2016, the entire contents of which are hereby incorporated by reference.

FIELD OF THE INVENTION

The present invention relates to a rolling device, a package for rolling device and a rolling module, and more particularly, to a rolling device, a package for rolling device and a rolling module for use in conveyance.

BACKGROUND OF THE INVENTION

In both traditional and high-tech manufacturing industries, production lines are usually used in product manufacturing in order to increase production efficiency and reduce manufacturing cost. A belt conveyor for conveying workpieces plays a very important role in the production line, because the conveyance efficiency of the belt conveyor has a large influence on the production efficiency of the whole production system.

Conventionally, rollers are devices used to move the belt conveyor. However, the conventional rollers for the belt conveyor are relatively complicated in structure to thereby increase the manufacturing cost.

It is therefore tried by the inventor to develop a rolling device that has a simple structure compared to the conventional rollers for moving the belt conveyor.

SUMMARY OF THE INVENTION

A primary object of the present invention is to provide a rolling device that has a simple structure compared to the conventional rollers for moving a belt conveyor.

To achieve the above and other objects, the rolling device provided according to the present invention includes a receiving seat defining a receiving recess thereon; at least one secondary rolling member being received in the receiving recess and in contact with a surface of the receiving recess; a primary rolling member having a portion received in the receiving recess to contact with a surface of the at least one secondary rolling member; a coupling section being connected to the receiving seat and used for coupling to an external object; and a stop section being connected to the receiving seat and defining a stop opening, and the stop opening having a size smaller than a maximum size of the primary rolling member.

In an embodiment of the present invention, the at least one secondary rolling member can be a ball, a wheel, an ellipsoid, a roller, a round tablet or a cylinder in configuration.

In an embodiment of the present invention, the primary rolling member can be a ball, a wheel, an ellipsoid, a roller, a round tablet or a cylinder in configuration.

In an embodiment of the present invention, the primary rolling member has a volume larger than that of the at least one secondary rolling member.

In an embodiment of the present invention, the receiving seat includes a base and a sidewall surrounding the base, such that the sidewall and the base together define the receiving recess in between them.

In an embodiment of the present invention, the receiving seat includes a shaft section, an upper wall and a lower wall. The shaft section is connected at two opposite ends to the upper wall and the lower wall, such that an outer surface of the shaft section, a lower surface of the upper wall and an upper surface of the lower wall together define the receiving recess between them. Alternatively, the receiving seat includes a shaft section and an upper wall; and the shaft section is connected at two opposite ends to the upper wall and the coupling section, such that an outer surface of the shaft section and a lower surface of the upper wall together define the receiving recess between them.

In an embodiment of the present invention, the coupling section includes a coupling protrusion connected to the receiving seat for inserting into a coupling hole on the external object.

In an embodiment of the present invention, the coupling section includes a bendable coupling portion connected to the receiving seat for inserting into a coupling hole on the external object. The bendable coupling portion is outward bent by an external force applied thereto, such that a retaining section of the external object is clamped between the bent coupling portion and the receiving seat.

In an embodiment of the present invention, the coupling section includes a coupling flange and a coupling groove sunken from an outer peripheral surface of the coupling flange. The coupling flange has a size larger than that of a coupling hole on the external object and is used to press against and force part of the material of the external object into the coupling groove.

In an embodiment of the present invention, the coupling section has a welding layer. Alternatively, the coupling section is provided with protrusions, grooves, flat surfaces or curved surfaces.

In an embodiment of the present invention, the coupling section is connected to the external object by means of riveting, expanded connection, welding or screw tightening.

In an embodiment of the present invention, the rolling device can be picked up with hand or using a tool; and the tool can be a vacuum picker, a gripping device or a magnetic picker.

In an embodiment of the present invention, the stop section can be integrally formed with the receiving seat by applying a force to deform the receiving seat or be additionally connected to the receiving seat.

In an embodiment of the present invention, the receiving seat, the secondary rolling member or the primary rolling member can have a lubricating substance applied thereto.

In an embodiment of the present invention, the stop opening can be round, elongated, square or polygonal in shape; or the stop opening is convex or concave in configuration.

In an embodiment of the present invention, the stop opening has a size larger than 1 mm or smaller than 500 mm; or the primary rolling member has a maximum size larger than 1.1 mm or smaller than 1000 mm.

In an embodiment of the present invention, the external object has an electroplated tin layer, an electroplated copper layer, an electroplated nickel layer, or a solder paste provided thereon in correspondence to the welding layer of the coupling section.

Another object of the present invention is to provide a package for rolling device, which includes a device carrier and at least one rolling device as described above. The device carrier includes a main body and at least one compartment; and the compartment is a recess formed on the main body for each holding one rolling device therein.

In an embodiment of the present invention, the main body of the device carrier can be a long belt or a tray in shape.

In an embodiment of the present invention, the package for rolling device further includes a cover for covering onto the at least one compartment.

The present invention further provides a rolling module, which is formed of at least one rolling device as described above and an external object, to which the rolling device is coupled.

In an embodiment of the present invention, the external object can be configured as a bar-shaped member, a carrier, an axle, a tray-like member, a rail, a slide rail, a leg post, a wheel supporting post, a wheel frame, a supporting stand, a board, a case, a printed circuit board (PCB) or a cover.

In an embodiment of the present invention, the external object is further connected to another object, such that the other object is carried by the external object and can be rolled or slid via the external object that has the rolling devices coupled thereto.

In an embodiment of the present invention, the rolling device is first removed from the compartment of the device carrier and positioned on the external object using an automatic picker; and is then heated and welded to the external object to be fixedly connected to the external object.

In an embodiment of the present invention, the rolling device is subjected to a force applied thereto by a pressing device, such that the coupling section of the rolling device is deformed under the force or the external object is pressed and deformed by the coupling section of the rolling device that is subjected to the force applied by the pressing device, bringing the rolling device to autonomously associate with part of a material of the external object.

In summary, the rolling device according to the present invention consisting of the receiving seat, the at least one secondary rolling member, the primary rolling member, the coupling section and the stop section can be directly and conveniently used for conveying articles.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and by referring to the accompanying drawings.

Figure 1A:
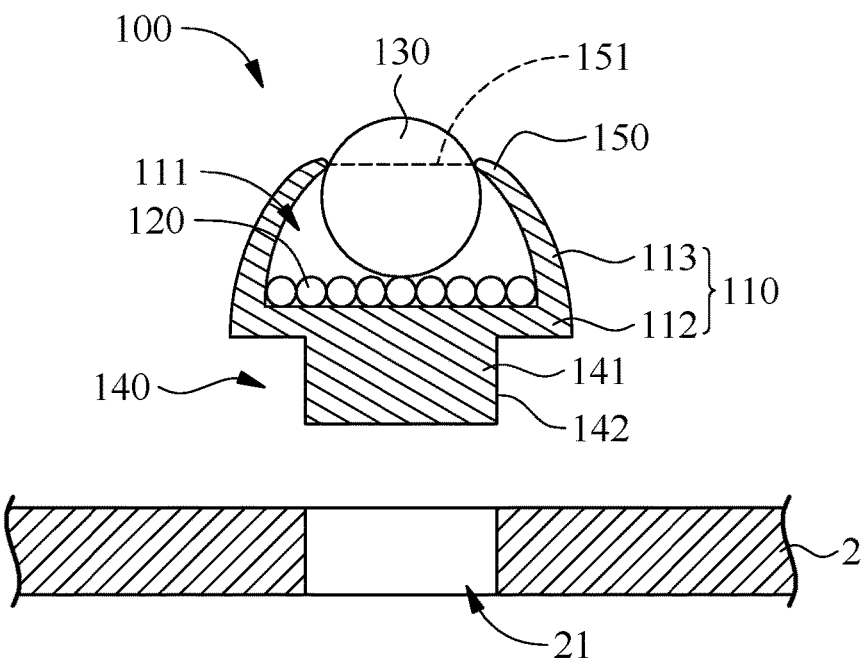
FIG. 1A is a sectional view showing a rolling device according to a first embodiment of the present invention before being coupled to an external object.
Figure 1B:
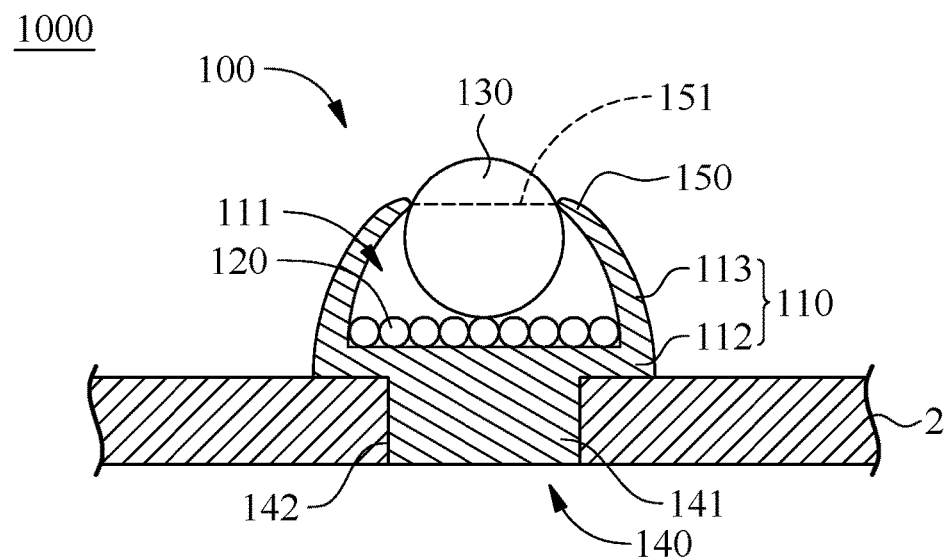
FIG. 1B is a sectional view showing the rolling device of FIG. 1A after being coupled to the external object.

Please refer to FIGS. 1A and 1B, which are sectional views showing a rolling device 100 according to a first embodiment of the present invention before and after being coupled to an external object 2, respectively.

The rolling device 100 includes a receiving seat 110, at least one secondary rolling member 120, a primary rolling member 130, a coupling section 140 and a stop section 150. The receiving seat 110, the primary rolling member 130 or the secondary rolling member 120 can be made of a metal, a plastic, a rubber, a silicone rubber, a glass or an acrylic material.

The receiving seat 110 defines a receiving recess 111 thereon. More specifically, the receiving seat 110 includes a base 112 and a sidewall 113. The sidewall 113 surrounds the base 112, so that the sidewall 113 and the base 112 together define the receiving recess 111 in between them. The receiving recess 111 can be substantially hemispherical in configuration.

The at least one secondary rolling member 120 is received in the receiving recess 111 of the receiving seat 110 and in contact with a round bottom surface of the hemispherical receiving recess 111. The at least one secondary rolling member 120 can be configured as a ball, a wheel, an ellipsoid, a roller, a round tablet or a cylinder. However, it is understood the secondary rolling member 120 is not necessarily limited to the above shapes. The secondary rolling member 120 in any other shape that allows it to roll also falls in the scope of the present invention.

The primary rolling member 130 has a portion received in the receiving recess 111 of the receiving seat 110 to contact with the surface of the at least one secondary rolling member 120, while the other portion of the primary rolling member 130 is exposed from the receiving recess 111. The primary rolling member 130 can be configured as a ball, a wheel, an ellipsoid, a roller, a round tablet or a cylinder. However, it is understood the primary rolling member 130 is not necessarily limited to the above shapes. The primary rolling member 130 in any other shape that allows it to roll also falls in the scope of the present invention. Further, the primary rolling member 130 has a volume larger than that of the at least one secondary rolling member 120. And, a lubricating substance, such as a lubricant, can be applied to the receiving seat 110, the secondary rolling member 120 or the primary rolling member 130 to enable an increased rolling efficiency thereof.

The coupling section 140 is connected to an underside of the base 112 of the receiving seat 110 for coupling to an external object 2. The external object 2 can be made of a metal or a plastic material. In the illustrated first embodiment, the coupling section 140 includes a coupling protrusion 141 connected to the underside of the receiving seat 110 for inserting into a coupling hole 21 on the external object 2, so that the coupling section 140 can be then connected to the external object 2 by means of welding or screw tightening. Further, the coupling section 140 can have a welding layer 142, via which the coupling section 140 is welded to an electroplated tin layer, an electroplated copper layer, an electroplated nickel layer or a solder paste on the external object 2. The rolling device 100 can be picked up with hand or using a tool and placed in the coupling hole 21 of the external object 2, which can be, for example, a printed circuit board (PCB). Then, the rolling device 100 and the external object 2 can be heated, so that the welding layer 142 and the solder paste are welded to each other. The welded areas are cooled and solidified later to thereby connect the rolling device 100 to the external object 2. Moreover, protrusions, grooves, flat surfaces or curved surfaces can be provided on the coupling protrusion 141 of the coupling section 140 for contacting with and connecting to the coupling hole 21 of the external object 2.

The stop section 150 is connected to the sidewall 113 of the receiving seat 110 and defines a stop opening 151. The stop opening 151 has a size smaller than a maximum size of the primary rolling member 130, and can be round, elongated or square in shape. Alternatively, the stop opening 151 can be convex or concave in configuration. Since the stop opening 151 has a size smaller than the maximum size of the primary rolling member 130, the primary rolling member 130 is stopped from moving out of the receiving recess 111 via the stop opening 151 to be partially confined in the receiving recess 111 of the receiving seat 110. The stop section 150 can be integrally formed with the receiving seat 110 by applying a force to deform the receiving seat 110. Alternatively, the stop section 150 can be additionally connected to the receiving seat 110. The stop opening 151 has a size larger than 1 mm or smaller than 500 mm; or the primary rolling member 130 has a maximum size larger than 1.1 mm or smaller than 1000 mm.

Further, the coupled rolling device 100 and external object 2 together form a rolling module 1000, which can be used with a belt conveyor (not shown) for conveying workpieces.

The following is a brief description of the steps for coupling the rolling device 100 to the external object 2. In a first step S1, the rolling device 100 and the external object 2 are provided. In a second step S2, align the coupling protrusion 141 of the coupling section 140 of the rolling device 100 with the coupling hole 21 of the external object 2 and move the rolling device 100 downward as indicated by the arrow shown in FIG. 1A. In a third step S3, insert the coupling protrusion 141 of the coupling section 140 of the rolling device 100 into the coupling hole 21 of the external object 2. Finally, in a fourth step S4, the rolling module 1000 shown in FIG. 1B is formed.

Figure 2A:
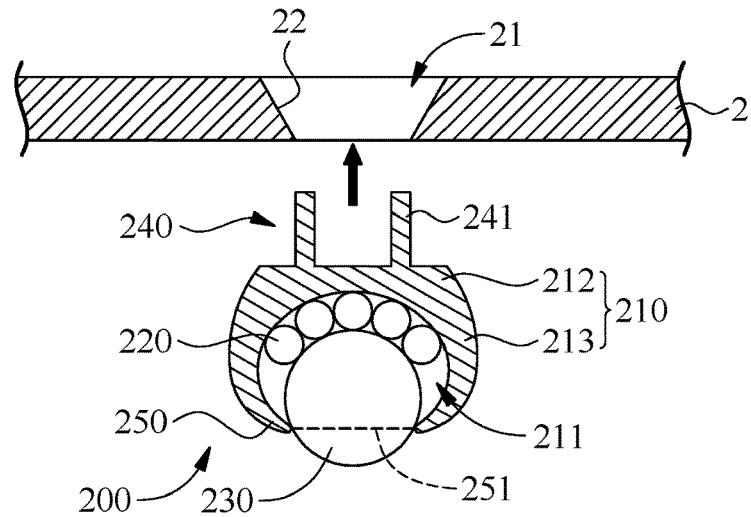
FIG. 2A is a sectional view showing a rolling device according to a second embodiment of the present invention before being coupled to an external object.
Figure 2B:
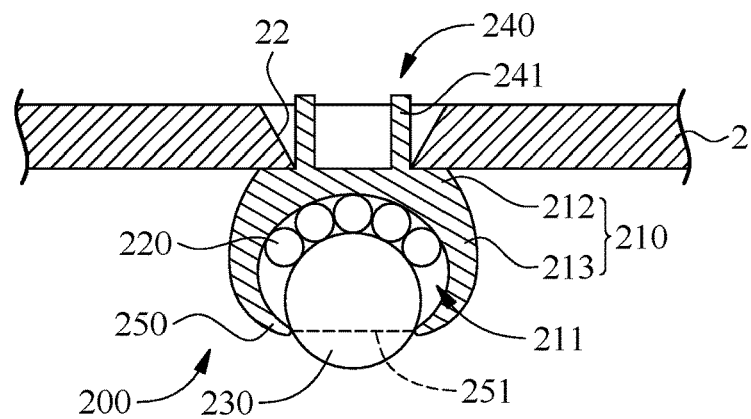
FIG. 2B is a sectional view showing the rolling device of FIG. 2A during being coupled to the external object.
Figure 2C:
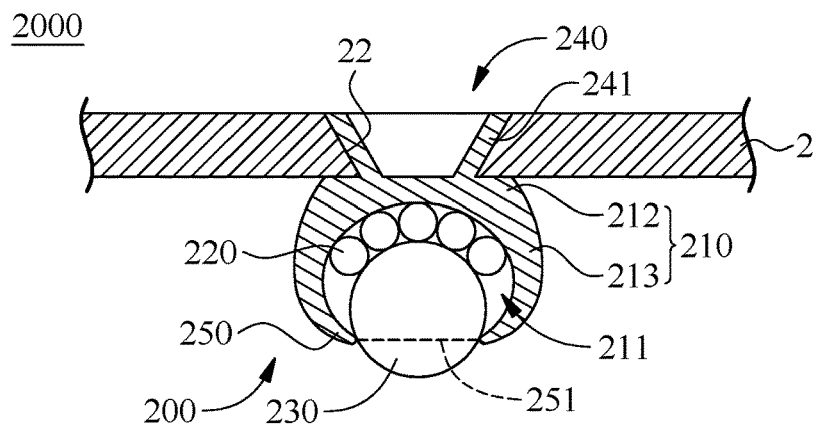
FIG. 2C is a sectional view showing the rolling device of FIG. 2A after being fully coupled to the external object.

Please refer to FIGS. 2A, 2B and 2C, which are sectional views showing a rolling device 200 according to a second embodiment of the present invention before, during and after being coupled to an external object 2, respectively.

The rolling device 200 includes a receiving seat 210, at least one secondary rolling member 220, a primary rolling member 230, a coupling section 240 and a stop section 250. The receiving seat 210, the primary rolling member 230 or the secondary rolling member 220 can be made of a metal, a plastic, a rubber, a silicone rubber, a glass or an acrylic material.

The receiving seat 210 defines a receiving recess 211 thereon. More specifically, the receiving seat 210 includes a base 212 and a sidewall 213. The sidewall 213 surrounds the base 212, so that the sidewall 213 and the base 212 together define the receiving recess 211 in between them. The receiving recess 211 can be substantially spherical in configuration.

The at least one secondary rolling member 220 is received in the receiving recess 211 of the receiving seat 210 and in contact with an inner surface of the spherical receiving recess 211. The at least one secondary rolling member 220 can be configured as a ball, a wheel, an ellipsoid, a roller, a round tablet or a cylinder. However, it is understood the secondary rolling member 220 is not necessarily limited to the above shapes. The secondary rolling member 220 in any other shape that allows it to roll also falls in the scope of the present invention.

The primary rolling member 230 has a portion received in the receiving recess 211 of the receiving seat 210 to contact with the surface of the at least one secondary rolling member 220 or be partially surrounded by a plurality of secondary rolling members 220, while the other portion of the primary rolling member 230 is exposed from the receiving recess 211. The primary rolling member 230 can be configured as a ball, a wheel, an ellipsoid, a roller, a round tablet or a cylinder. However, it is understood the primary rolling member 230 is not necessarily limited to the above shapes. The primary rolling member 230 in any other shape that allows it to roll also falls in the scope of the present invention. Further, the primary rolling member 230 has a volume larger than that of the at least one secondary rolling member 220. And, a lubricating substance, such as a lubricant, can be applied to the receiving seat 210, the secondary rolling member 220 or the primary rolling member 230 to enable an increased rolling efficiency thereof.

The coupling section 240 is connected to an underside of the base 212 of the receiving seat 210 for coupling to an external object 2. The external object 2 can be made of a metal or a plastic material. In the illustrated second embodiment, the coupling section 240 includes two bendable coupling portions 241 connected to the underside of the receiving seat 210 for inserting into a coupling hole 21 on the external object 2. The bendable coupling portions 241 are respectively outward bent by applying an external force thereto, such that a retaining section 22 of the external object 2 is clamped between the bent coupling portions 241 and the receiving seat 210.

The stop section 250 is connected to the sidewall 213 of the receiving seat 210 and defines a stop opening 251. The stop opening 251 has a size smaller than a maximum size of the primary rolling member 230, and can be round, elongated or square in shape. Alternatively, the stop opening 251 can be convex or concave in configuration. Since the stop opening 251 has a size smaller than the maximum size of the primary rolling member 230, the primary rolling member 230 is stopped from moving out of the receiving recess 211 via the stop opening 251 to be partially confined in the receiving recess 211 of the receiving seat 210. The stop section 250 can be integrally formed with the receiving seat 210 by applying a force to deform the receiving seat 210. Alternatively, the stop section 250 can be additionally connected to the receiving seat 210. The stop opening 251 has a size larger than 1 mm or smaller than 500 mm; or the primary rolling member 230 has a maximum size larger than 1.1 mm or smaller than 1000 mm.

Further, the coupled rolling device 200 and external object 2 together form a rolling module 2000, which can be used with a belt conveyor (not shown) for conveying workpieces.

The following is a brief description of the steps for coupling the rolling device 200 to the external object 2. In a first step S1, the rolling device 200 and the external object 2 are provided. In a second step S2, align the bendable coupling portions 241 of the coupling section 240 of the rolling device 200 with the coupling hole 21 of the external object 2 and move the rolling device 200 upward as indicated by the arrow shown in FIG. 2A. In a third step S3, insert the bendable coupling portions 241 of the coupling section 240 of the rolling device 200 into the coupling hole 21 of the external object 2. In a fourth step S4, apply an external force to the bendable coupling portions 241, so that the bendable coupling portions 241 are respectively outward bent and the retaining section 22 of the external object 2 is clamped between the bent coupling portions 241 and the receiving seat 210. Finally, in a fifth step S5, the rolling module 2000 shown in FIG. 2C is formed.

Figure 3A:
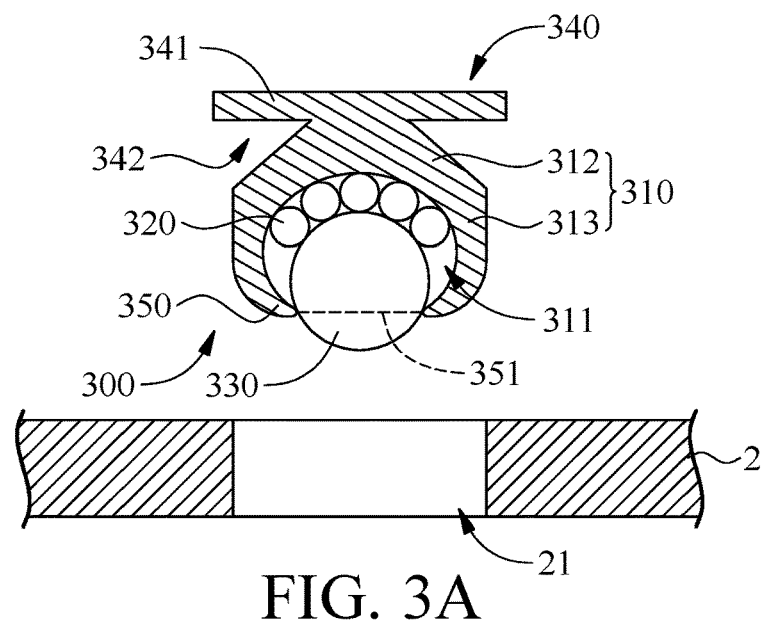
FIG. 3A is sectional view showing a rolling device according to a third embodiment of the present invention before being coupled to an external object.
Figure 3B:
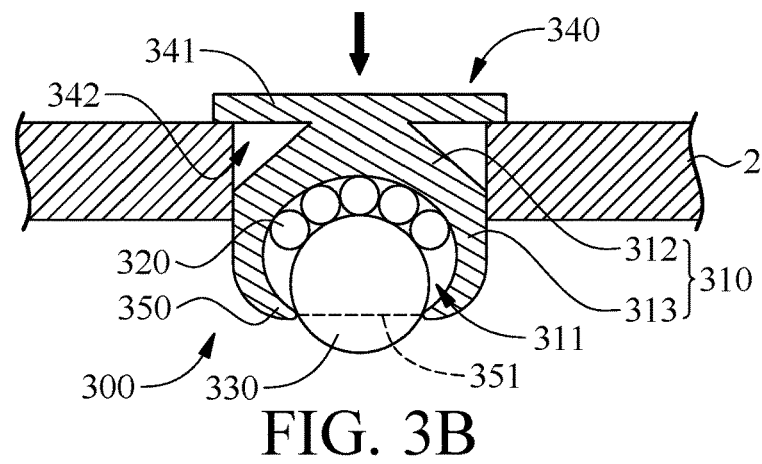
FIG. 3B is a sectional view showing the rolling device of FIG. 3A during being coupled to the external object.
Figure 3C:
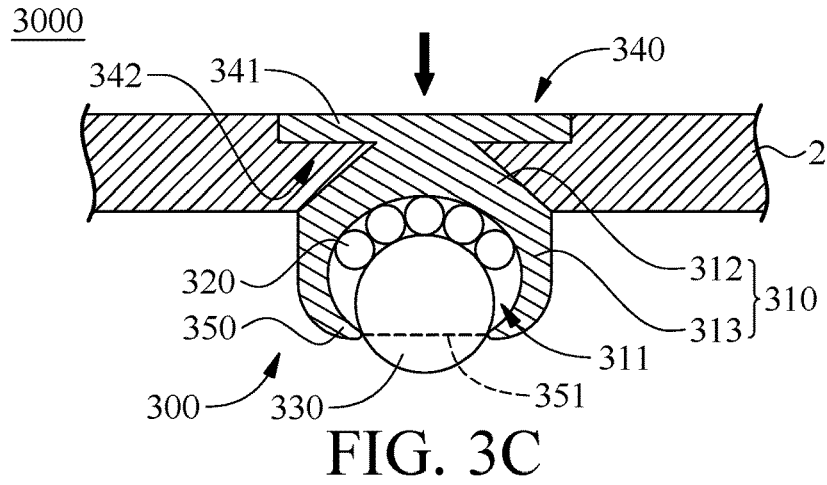
FIG. 3C is a sectional view showing the rolling device of FIG. 3A after being fully coupled to the external object.

Please refer to FIGS. 3A, 3B and 3C, which are sectional views showing a rolling device 300 according to a third embodiment of the present invention before, during and after being coupled to an external object 2, respectively.

The rolling device 300 includes a receiving seat 310, at least one secondary rolling member 320, a primary rolling member 330, a coupling section 340 and a stop section 350. The receiving seat 310, the primary rolling member 330 or the secondary rolling member 320 can be made of a metal, a plastic, a rubber, a silicone rubber, a glass or an acrylic material.

The receiving seat 310 defines a receiving recess 311 thereon. More specifically, the receiving seat 310 includes a base 312 and a sidewall 313. The sidewall 313 surrounds the base 312, so that the sidewall 313 and the base 312 together define the receiving recess 311 in between them. The receiving recess 311 can be substantially spherical in configuration.

The at least one secondary rolling member 320 is received in the receiving recess 311 of the receiving seat 310 and in contact with an inner surface of the spherical receiving recess 311. The at least one secondary rolling member 320 can be configured as a ball, a wheel, an ellipsoid, a roller, a round tablet or a cylinder. However, it is understood the secondary rolling member 320 is not necessarily limited to the above shapes. The secondary rolling member 320 in any other shape that allows it to roll also falls in the scope of the present invention.

The primary rolling member 330 has a portion received in the receiving recess 311 of the receiving seat 310 to contact with the surface of the at least one secondary rolling member 320 or be partially surrounded by a plurality of secondary rolling members 320, while the other portion of the primary rolling member 330 is exposed from the receiving recess 311. The primary rolling member 330 can be configured as a ball, a wheel, an ellipsoid, a roller, a round tablet or a cylinder. However, it is understood the primary rolling member 330 is not necessarily limited to the above shapes. The primary rolling member 330 in any other shape that allows it to roll also falls in the scope of the present invention. Further, the primary rolling member 330 has a volume larger than that of the at least one secondary rolling member 320. And, a lubricating substance, such as a lubricant, can be applied to the receiving seat 310, the secondary rolling member 320 or the primary rolling member 330 to enable an increased rolling efficiency thereof.

The coupling section 340 is connected to an underside of the base 312 of the receiving seat 310 for coupling to an external object 2. The external object 2 can be made of a metal or a plastic material. In the illustrated third embodiment, the coupling section 340 includes a coupling flange 341 and a coupling groove 342. The coupling groove 342 is sunken from an outer peripheral surface of the coupling flange 341. The coupling flange 341 has a size larger than that of a coupling hole 21 on the external object 2 and serves to press against and force a part of the material of the external object 2 into the coupling groove 342, such that the rolling device 300 and the external object 2 are connected to each other. The coupling flange 341 of the coupling section 340 has a maximum breadth that is larger than a maximum breadth of the receiving seat 310.

The stop section 350 is connected to the sidewall 313 of the receiving seat 310 and defines a stop opening 351. The stop opening 351 has a size smaller than a maximum size of the primary rolling member 330, and can be round, elongated, square or polygonal in shape. Alternatively, the stop opening 251 can be convex or concave in configuration. Since the stop opening 251 has a size smaller than the maximum size of the primary rolling member 330, the primary rolling member 330 is stopped from moving out of the receiving recess 311 via the stop opening 351 to be partially confined in the receiving recess 311 of the receiving seat 310. The stop section 350 can be integrally formed with the receiving seat 310 by applying a force to deform the receiving seat 310. Alternatively, the stop section 350 can be additionally connected to the receiving seat 310. The stop opening 351 has a size larger than 1 mm or smaller than 500 mm; or the primary rolling member 330 has a maximum size larger than 1.1 mm or smaller than 1000 mm.

Further, the coupled rolling device 300 and external object 2 together form a rolling module 3000, which can be used with a belt conveyor (not shown) for conveying workpieces.

The following is a brief description of the steps for coupling the rolling device 300 to the external object 2. In a first step S1, the rolling device 300 and the external object 2 are provided. In a second step S2, align the coupling flange 341 of the coupling section 340 of the rolling device 300 with the coupling hole 21 of the external object 2 and move the rolling device 300 downward as indicated by the arrow shown in FIG. 3A. In a third step S3, move the rolling device 300 through the coupling hole 21 of the external object 2 until the coupling flange 341 of the coupling section 340 of the rolling device 300 is abutted against the coupling hole 21 of the external object 2. In a fourth step S4, downward apply an external force to the rolling device 300, so that the coupling flange 341 of the coupling section 340 of the rolling device 300 is downward pressed against and forced into the coupling hole 21 of the external object 2. At this point, a part of the material of the external object 2 around the coupling hole 21 is trapped into the coupling groove 342 of the coupling section 340 of the rolling device 300. Finally, in a fifth step S5, the rolling module 3000 shown in FIG. 3C is formed.

Figure 4:
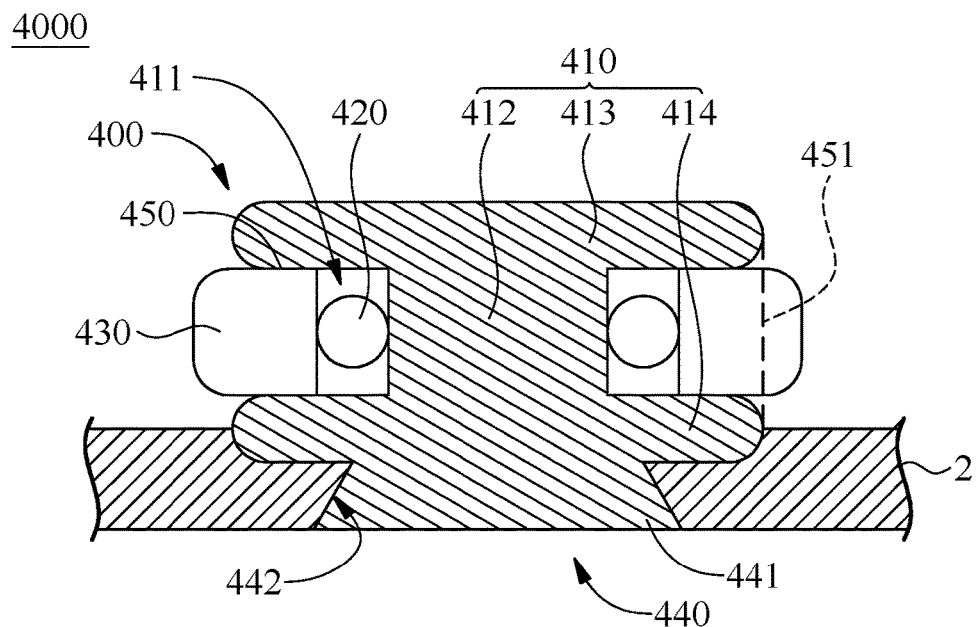
FIG. 4 is a sectional view showing a rolling device according to a fourth embodiment of the present invention after being coupled to an external object.

Please refer to FIG. 4, which is a sectional view showing a rolling device 400 according to a fourth embodiment of the present invention after being coupled to an external object 2.

The rolling device 400 includes a receiving seat 410, at least one secondary rolling member 420, a primary rolling member 430, a coupling section 440 and a stop section 450. The receiving seat 410, the primary rolling member 430 or the secondary rolling member 420 can be made of a metal, a plastic, a rubber, a silicone rubber, a glass or an acrylic material.

The receiving seat 410 defines a receiving recess 411 thereon. More specifically, the receiving seat 410 includes a shaft section 412, an upper wall 413 and a lower wall 414. The shaft section 412 is connected at two opposite ends to the upper wall 413 and the lower wall 414. An outer surface of the shaft section 412, a lower surface of the upper wall 413, and an upper surface of the lower wall 414 together define the receiving recess 411 between them, such that the receiving recess 411 is an open-sided U-shaped recess.

The at least one secondary rolling member 420 is received in the receiving recess 411 of the receiving seat 410 and in contact with a bottom surface of the open-sided U-shaped receiving recess 411. More specifically, the at least one secondary rolling member 420 is disposed in the receiving recess 411 to surround and contact with the outer surface the shaft section 412 of the receiving seat 410. The at least one secondary rolling member 420 can be configured as a ball, a wheel, an ellipsoid, a roller, a round tablet or a cylinder. However, it is understood the secondary rolling member 420 is not necessarily limited to the above shapes. The secondary rolling member 420 in any other shape that allows it to roll also falls in the scope of the present invention.

The primary rolling member 430 has a portion received in the receiving recess 411 of the receiving seat 410 to contact with the surface of the at least one secondary rolling member 420, while the other portion of the primary rolling member 430 is exposed from the receiving recess 411. More specifically, the primary rolling member 430 is configured as a wheel with the shaft section 412 of the receiving seat 410 being a central rotary shaft thereof; and the primary rolling member 430 has a radially inner peripheral surface in contact with the surface of the at least one secondary rolling member 420, such that the primary rolling member 430 can rotate about the shaft section 412. However, it is understood the primary rolling member 430 is not necessarily limited to the shape of a wheel. The primary rolling member 430 in any other shape that allows it to roll also falls in the scope of the present invention. Further, a lubricating substance, such as a lubricant, can be applied to the receiving seat 410, the secondary rolling member 420 or the primary rolling member 430 to enable an increased rolling efficiency thereof.

The coupling section 440 is connected to an underside of the lower wall 414 of the receiving seat 410 for coupling to an external object 2. The external object 2 can be made of a metal or a plastic material. In the illustrated fourth embodiment, the coupling section 440 is structurally similar to the coupling section 340 shown in FIGS. 3A to 3C to include a coupling flange 441 and a coupling groove 442. Therefore, the coupling section 440 is not repeatedly described herein.

The stop section 450 is connected to the upper wall 413 of the receiving seat 410 and includes a stop opening 451 located at a position radially outside the shaft section 412. A size of the stop opening 451 in a radial direction relative to the shaft section 412 is smaller than a maximum size of the primary rolling member 430 in a radial direction relative to the shaft section 412 but larger than an inner diameter of the primary rolling member 430. Since the size of the stop opening 451 in the radial direction relative to the shaft section 412 is smaller than the maximum size of the primary rolling member 430 in the radial direction relative to the shaft section 412, the primary rolling member 430 is stopped by the stop opening 451 from radially moving outward and is partially confined in the receiving recess 411 of the receiving seat 410. The stop section 450 can be integrally formed with the receiving seat 410 by applying a force to deform the receiving seat 410. Alternatively, the stop section 450 can be additionally connected to the receiving seat 410.

Further, the coupled rolling device 400 and external object 2 together form a rolling module 4000, which can be used with a belt conveyor (not shown) for conveying workpieces. Since the steps for coupling the rolling device 400 to the external object 2 are the same as those for coupling the rolling device 300 to the external object 2, they are not repeatedly described herein. The rolling module 4000 so formed is shown in FIG. 4.

Figure 5:
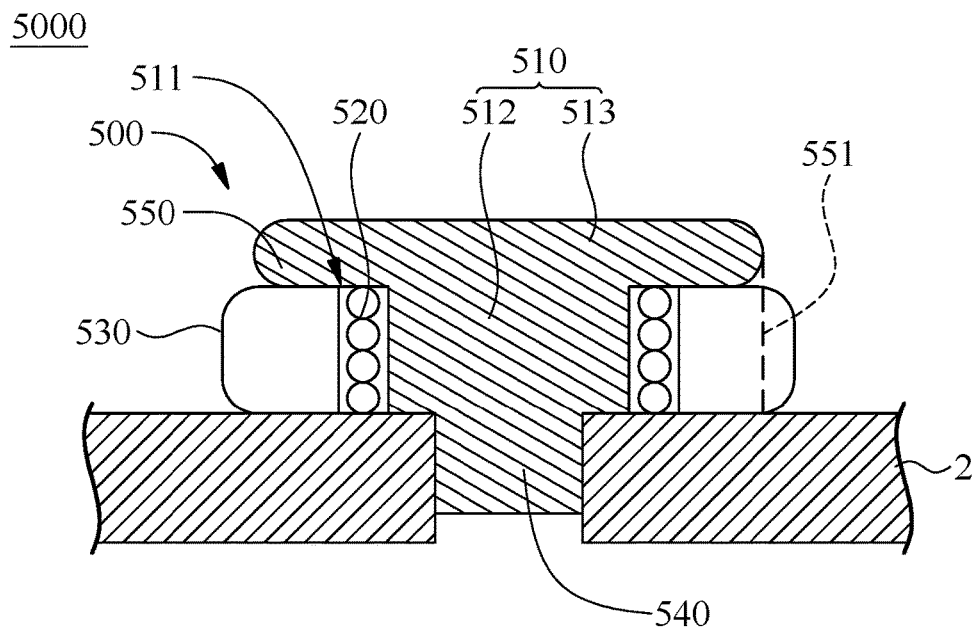
FIG. 5 is a sectional view showing a rolling device according to a fifth embodiment of the present invention after being coupled to an external object.

Please refer to FIG. 5, which is a sectional view showing a rolling device 500 according to a fifth embodiment of the present invention after being coupled to an external object 2.

The rolling device 500 includes a receiving seat 510, at least one secondary rolling member 520, a primary rolling member 530, a coupling section 540 and a stop section 550. The receiving seat 510, the primary rolling member 530 or the secondary rolling member 520 can be made of a metal, a plastic, a rubber, a silicone rubber, a glass or an acrylic material.

The receiving seat 510 defines a receiving recess 511 thereon. More specifically, the receiving seat 510 includes a shaft section 512 and an upper wall 513. The shaft section 512 is connected at two opposite ends to the upper wall 513 and the coupling section 540. An outer surface of the shaft section 512, a lower surface of the upper wall 513, and an upper surface of an external object 2 together define the receiving recess 511 between them, such that the receiving recess 511 is an open-sided U-shaped recess.

The at least one secondary rolling member 520 is received in the receiving recess 511 of the receiving seat 510 and in contact with a bottom surface of the open-sided U-shaped receiving recess 511. More specifically, the at least one secondary rolling member 520 is disposed in the receiving recess 511 to surround and contact with the outer surface the shaft section 512 of the receiving seat 510. The at least one secondary rolling member 520 can be configured as a ball, a wheel, an ellipsoid, a roller, a round tablet or a cylinder. However, it is understood the secondary rolling member 520 is not necessarily limited to the above shapes. The secondary rolling member 520 in any other shape that allows it to roll also falls in the scope of the present invention.

The primary rolling member 530 has a portion received in the receiving recess 511 of the receiving seat 510 to contact with the surface of the at least one secondary rolling member 520, while the other portion of the primary rolling member 530 is exposed from the receiving recess 511. More specifically, the primary rolling member 530 is configured as a wheel with the shaft section 512 of the receiving seat 510 being a central rotary shaft thereof; and the primary rolling member 530 has a radially inner peripheral surface in contact with the surface of the at least one secondary rolling member 520, such that the primary rolling member 530 can rotate about the shaft section 512. However, it is understood the primary rolling member 530 is not necessarily limited to the shape of a wheel. The primary rolling member 530 in any other shape that allows it to roll also falls in the scope of the present invention. Further, a lubricating substance, such as a lubricant, can be applied to the receiving seat 510, the secondary rolling member 520 or the primary rolling member 530 to enable an increased rolling efficiency thereof.

The coupling section 540 is connected to an underside of the receiving seat 510 for coupling to an external object 2. The external object 2 can be made of a metal or a plastic material. In the illustrated fifth embodiment, the coupling section 540 is structurally similar to the coupling section 140 shown in FIGS. 1A and 1B and is therefore not repeatedly described herein.

The stop section 550 is connected to the upper wall 513 of the receiving seat 510 and includes a stop opening 551 located at a position radially outside the shaft section 512. A size of the stop opening 551 in a radial direction relative to the shaft section 512 is smaller than a maximum size of the primary rolling member 530 in a radial direction relative to the shaft section 512 but larger than an inner diameter of the primary rolling member 530. Since the size of the stop opening 551 in the radial direction relative to the shaft section 512 is smaller than the maximum size of the primary rolling member 530 in the radial direction relative to the shaft section 512, the primary rolling member 530 is stopped by the stop opening 551 from radially moving outward and is partially confined in the receiving recess 511 of the receiving seat 510. The stop section 550 can be integrally formed with the receiving seat 510 by applying a force to deform the receiving seat 510. Alternatively, the stop section 550 can be additionally connected to the receiving seat 510.

Further, the coupled rolling device 500 and external object 2 together form a rolling module 5000, which can be used with a conveyor belt (not shown) for conveying workpieces. Since the steps for coupling the rolling device 500 to the external object 2 are the same as those for coupling the rolling device 100 to the external object 2, they are not repeatedly described herein. The rolling module 5000 so formed is shown in FIG. 5.

According to the above five embodiments, the rolling devices 100, 200, 300, 400 and 500 are exchangeable in terms of their coupling sections 140, 240, 340, 440 and 540. Therefore, the rolling device and the rolling module according to the present invention are not limited to the above-described five configurations. Further, the coupling section 140, 240, 340, 440, 540 can be connected to the external object 2 by means of riveting, expanded connection, welding or screw tightening. Moreover, the rolling device 100, 200, 300, 400, 500 can be picked up with hand or using a tool, which can be, for example, a vacuum picker, a gripping device or a magnetic picker.

Figure 6:
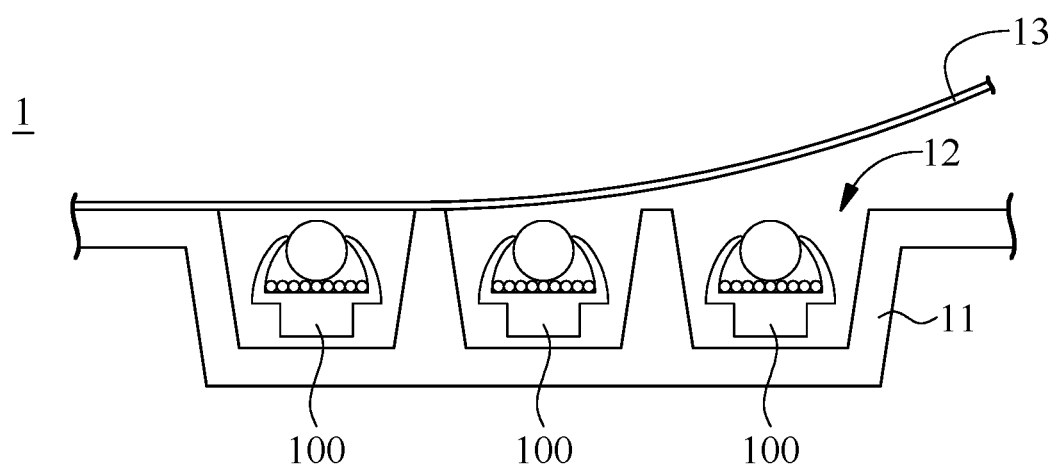
FIG. 6 is a sectional view showing an embodiment of a package for rolling device according to the present invention.

FIG. 6 is a sectional view showing an embodiment of a package for rolling device according to the present invention.

The package for rolling device includes a device carrier 1 and at least one rolling device 100, 200, 300, 400, 500 having been described above. The device carrier 1 includes a main body 11, at least one compartment 12 and a cover 13. The at least one compartment 12 is a recess formed on the main body 11 for each holding one rolling device 100, 200, 300, 400, 500 therein. The cover 13 is configured for covering onto the at least one compartment 12, so that each rolling device 100, 200, 300, 400, 500 packed in the package is sealed in one compartment 12. To use the rolling device 100, 200, 300, 400, 500, first remove it from the compartment 12 of the device carrier 1 and position it on the external object 2 using an automatic picker (not shown). Then, heat and weld the rolling device 100, 200, 300, 400, 500 to the external object 2.

The rolling devices 100, 200, 300, 400, 500 positioned in the compartments 12 of the device carrier 1 can be individually removed therefrom with hand or using a tool, which can be, for example, a vacuum picker, a gripping device or a magnetic picker, for connecting to the external object 2.

In other operable embodiments, the device carrier 1 can be a long belt or a tray in shape. The long belt-shaped device carrier 1 can be wound into a roll for convenient storage in an organized manner. On the other hand, a plurality of tray-shaped device carriers 1 can be stacked for convenient storage.

Figure 7:
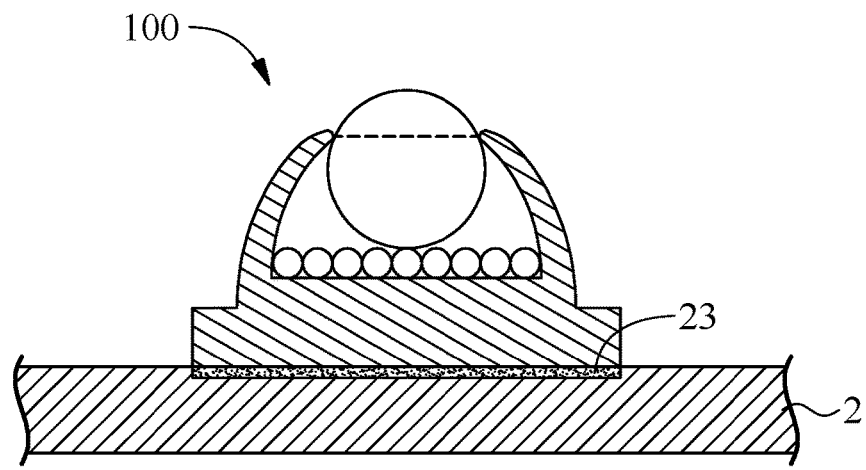
FIG. 7 is a sectional view showing a rolling device according to a sixth embodiment of the present invention after being coupled to an external object.

Please refer to FIG. 7, which is a sectional view showing a rolling device according to a sixth embodiment of the present invention after being coupled to an external object 2. In the sixth embodiment, the external object 2 is a printed circuit board (PCB), and the rolling device, which is denoted by reference numeral 100 in FIG. 7 but can be any one of the rolling devices 100, 200, 300, 400, 500 and any combination thereof, is connected at a bottom surface to a plated welding layer 23 on the external object 2 by means of welding.

Figure 8:
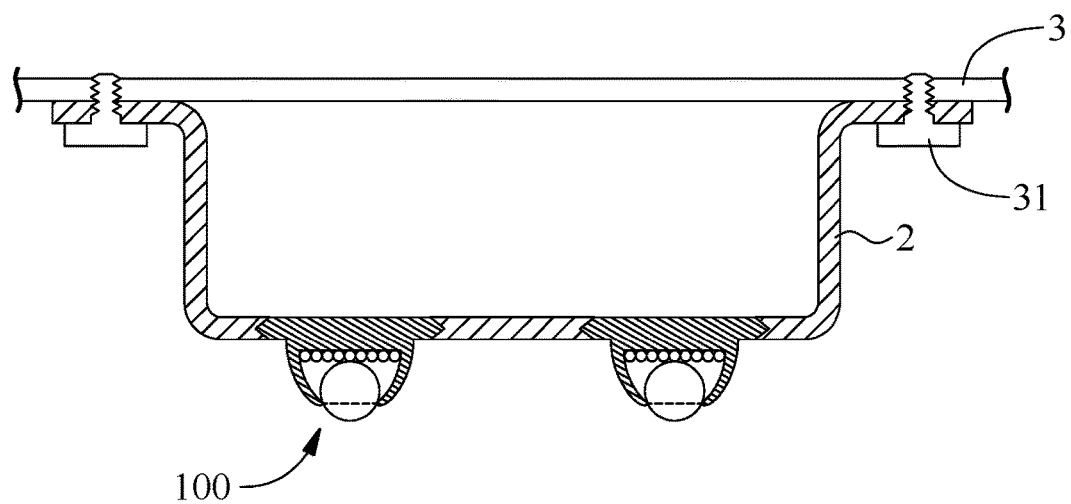
FIG. 8 is a sectional view showing a rolling device according to a seventh embodiment of the present invention after being coupled to an external object, which is then connected to another object.

FIG. 8 is a sectional view showing a rolling device according to a seventh embodiment of the present invention after being coupled to an external object 2, which is then connected to another object 3. In the seventh embodiment, the external object 2 can be configured as a bar-shaped member, a carrier, an axle, a tray-like member, a rail, a slide rail, a leg post, a wheel supporting post, a wheel frame, a supporting stand, a board, a case or a cover, so that the external object 2 can be further connected to another object 3. In this case, the other object 3 is carried by the external object 2 and can be rolled or slid via the external object 2 that has the rolling devices 100, 200, 300, 400, 500 coupled thereto. The external object 2 can be connected to the other object 3 by means of riveting, expanded connection, welding, screw tightening or snap-fitting. Alternatively, the external object 2 can be integrally formed with the other object 3. In the illustrated seventh embodiment, the external object 2 is connected to the other object 3 by screw tightening using screws 31.

Figure 9:
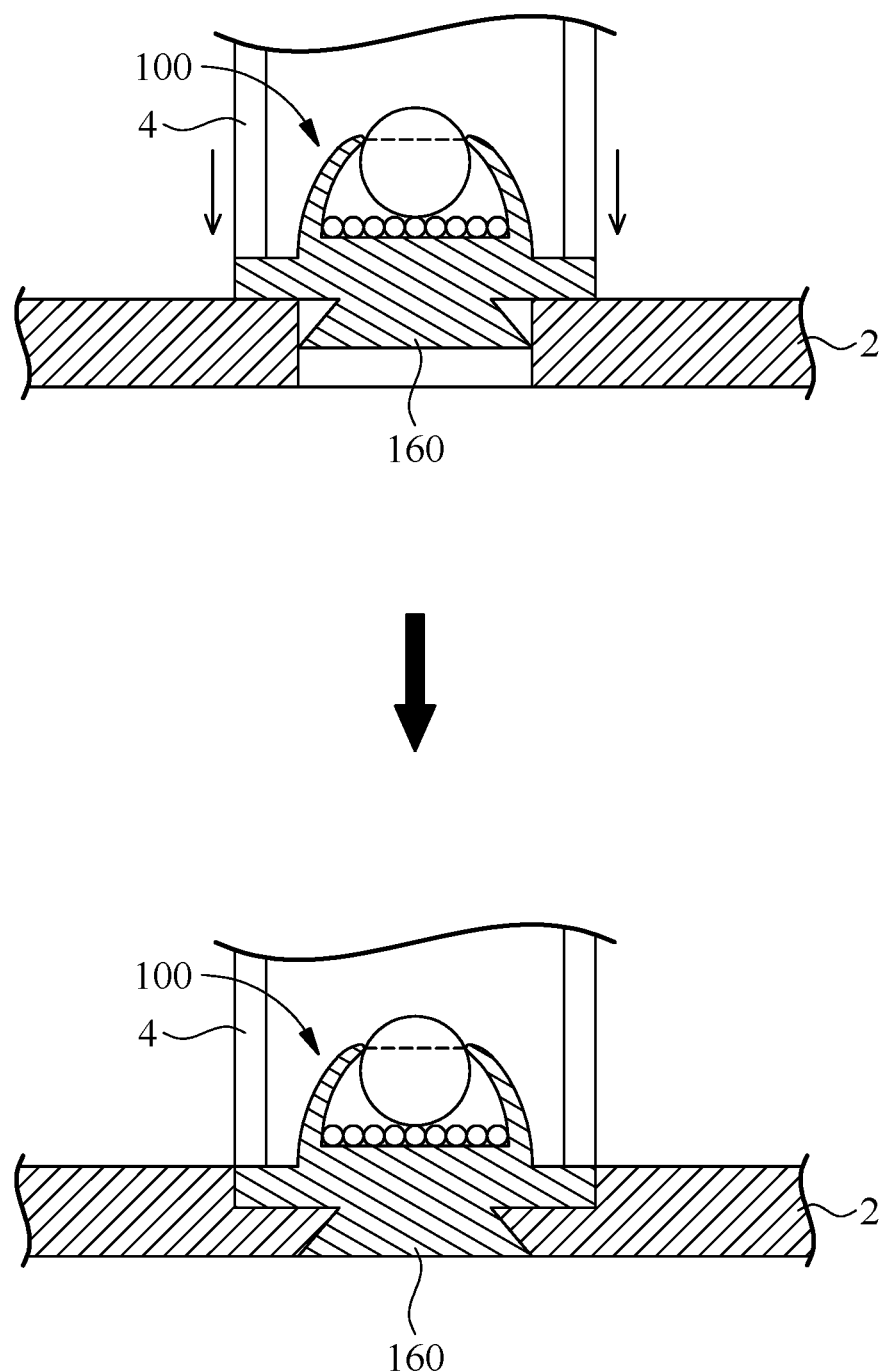
FIG. 9 is a sectional view showing a rolling device according to an eighth embodiment of the present invention during and after being coupled to an external object.
Figure 10:
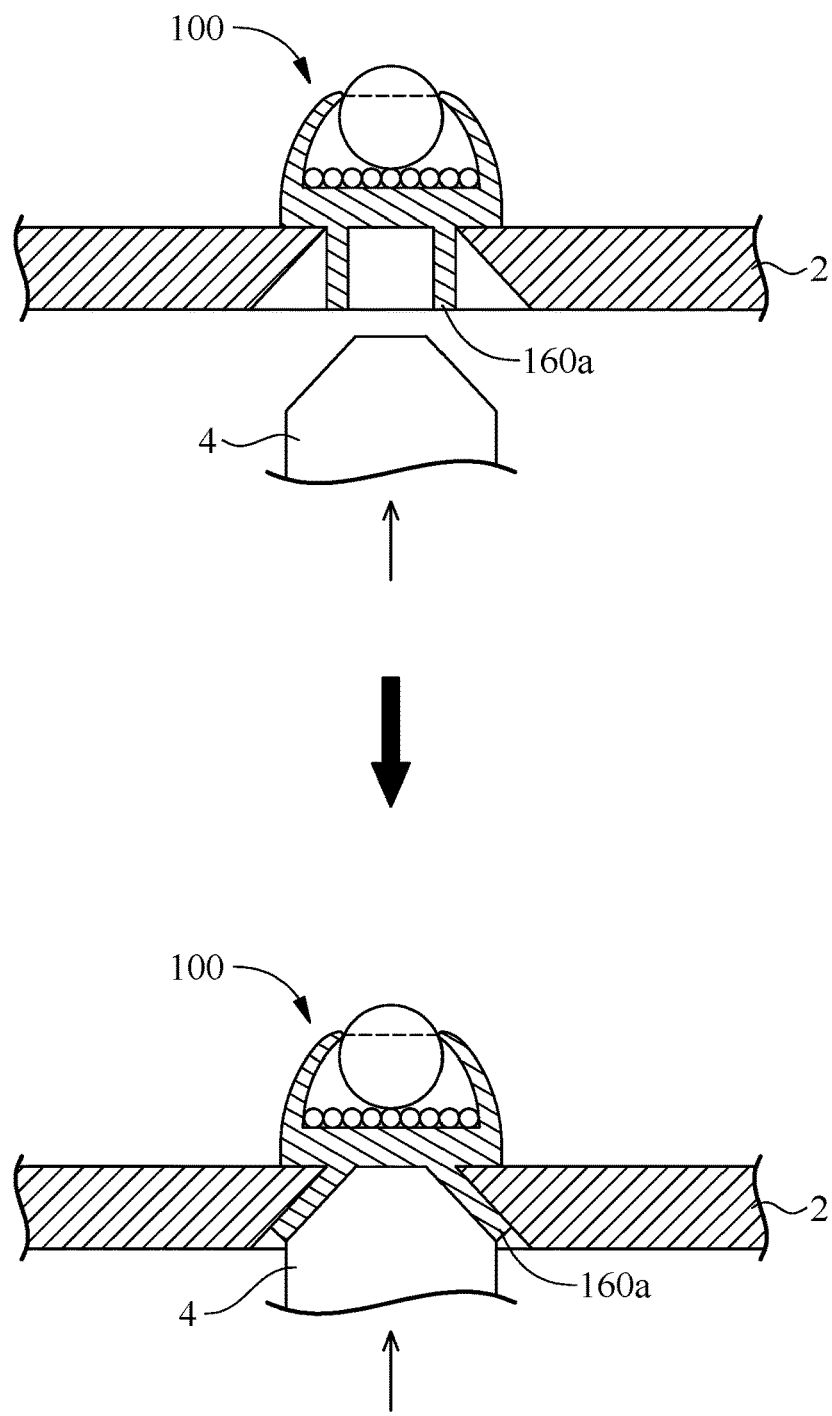
FIG. 10 is a sectional view showing a rolling device according to a ninth embodiment of the present invention during and after being coupled to an external object.
Figure 11:
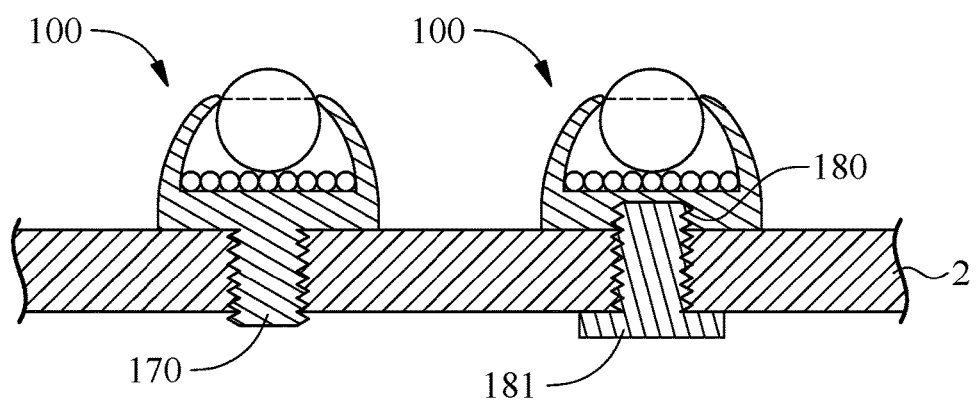
FIG. 11 is a sectional view showing a rolling device according to a tenth embodiment of the present invention after being coupled to an external object.
Figure 12:
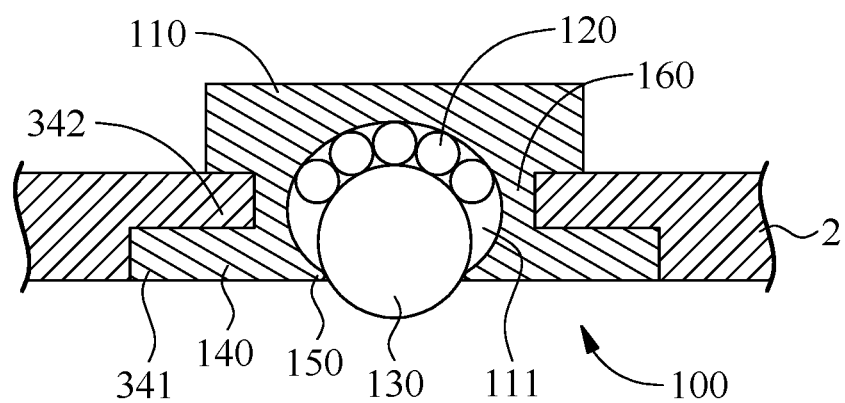
FIG. 12 is a sectional view showing a rolling device according to an eleventh embodiment of the present invention during and after being coupled to an external object.

Please refer to FIGS. 9, 10, 11 and 12, which are sectional views showing rolling devices according to an eighth, a ninth, a tenth and an eleventh embodiment of the present invention, respectively, after being coupled to an external object 2. In any one of the eighth, ninth, tenth and eleventh embodiments, the rolling device, which is denoted by reference numeral 100 in FIGS. 9, 10 and 11 but can be any one of the rolling devices 100, 200, 300, 400, 500 and any combination thereof, is subjected to a force applied thereto by a pressing device 4. In the eighth and eleventh embodiments as shown in FIG. 9 and FIG. 12, when the rolling device 100 is subjected to the applied force, a coupling section 160 of the rolling device 100 under the force presses against and deforms the external object 2, bringing the rolling device 100 to autonomously associate with part of the material of the external object 2. In the ninth embodiment as shown in FIG. 10, when the rolling device 100 is subjected to the applied force, a coupling section 160a of the rolling device 100 is deformed under the force to associate with part of the material of the external object 2. Alternatively, in the tenth embodiment as shown in FIG. 11, the rolling device 100 is provided with an externally threaded stem 170 or an internally threaded bore 180. The rolling device 100 can be coupled to the external object 2 by directly screwing the threaded stem 170 into the external object 2, or by extending a screw 181 through the external object 2 into the threaded bore 180.

In summary, the rolling device according to the present invention consisting of the receiving seat, the at least one secondary rolling member, the primary rolling member, the coupling section and the stop section can be directly and conveniently used with a belt conveyor for conveying workpieces.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. A rolling device, comprising:
    a receiving seat defining a receiving recess thereon;
    at least one secondary rolling member being received in the receiving recess and in contact with a surface of the receiving recess;
    a primary rolling member having a portion received in the receiving recess to contact with a surface of the at least one secondary rolling member;
    a coupling section being connected to the receiving seat and coupled to an external object; and
    a stop section being connected to the receiving seat and defining a stop opening, and the stop opening having a size smaller than a maximum size of the primary rolling member;
        wherein the coupling section includes a bendable coupling portion connected to the receiving seat for inserting into a coupling hole on the external object and the bendable coupling portion being outward bent by an external force applied thereto, such that a retaining section of the external object is clamped between the bent coupling portion and the receiving seat or the coupling section includes a coupling flange and a coupling groove sunken from an outer peripheral surface of the coupling flange; and the coupling flange having a size larger than that of a coupling hole on the external object and pressing against and forcing part of a material of the external object into the coupling groove.

2. The rolling device as claimed in claim 1, wherein the at least one secondary rolling member can be a ball, a wheel, an ellipsoid, a roller, a round tablet or a cylinder in configuration.

3. The rolling device as claimed in claim 1, wherein the primary rolling member can be a ball, a wheel, an ellipsoid, a roller, a round tablet or a cylinder in configuration.

4. The rolling device as claimed in claim 1, wherein the primary rolling member has a volume larger than that of the at least one secondary rolling member.

5. The rolling device as claimed in claim 1, wherein the receiving seat includes a base and a sidewall surrounding the base, such that the sidewall and the base together define the receiving recess in between them.

6. The rolling device as claimed in claim 1, wherein the receiving seat includes a shaft section, an upper wall and a lower wall; and the shaft section being connected at two opposite ends to the upper wall and the lower wall, such that an outer surface of the shaft section, a lower surface of the upper wall and an upper surface of the lower wall together define the receiving recess between them; or wherein the receiving seat includes a shaft section and an upper wall; and the shaft section being connected at two opposite ends to the upper wall and the coupling section, such that an outer surface of the shaft section and a lower surface of the upper wall together define the receiving recess between them.

7. The rolling device as claimed in claim 1, wherein the coupling section includes a coupling protrusion connected to the receiving seat for inserting into a coupling hole on the external object.

8. The rolling device as claimed in claim 1, wherein the coupling section has a welding layer; or wherein the coupling section is provided with protrusions, grooves, flat surfaces or curved surfaces.

9. The rolling device as claimed in claim 1, wherein the coupling section is connected to the external object by means of riveting, expanded connection, welding or screw tightening.

10. The rolling device as claimed in claim 1, wherein the rolling device is picked up with hand or using a tool; and the tool can be a vacuum picker, a gripping device or a magnetic picker.

11. The rolling device as claimed in claim 1, wherein the stop section can be integrally formed with the receiving seat by applying a force to deform the receiving seat or be additionally connected to the receiving seat.

12. The rolling device as claimed in claim 1, wherein the receiving seat, the secondary rolling member or the primary rolling member can have a lubricating substance applied thereto.

13. The rolling device as claimed in claim 1, wherein the coupling section can be round, elongated, square or polygonal in shape; or the stop opening is convex or concave in configuration.

14. The rolling device as claimed in claim 1, wherein the stop opening has a size larger than 1 mm or smaller than 500 mm; or the primary rolling member has a maximum size larger than 1.1 mm or smaller than 1000 mm.

15. The rolling device as claimed in claim 8, wherein the external object has an electroplated tin layer, an electroplated copper layer, an electroplated nickel layer or a solder paste provided thereon in correspondence to the welding layer of the coupling section.

16. A package for rolling device, comprising a device carrier and at least one rolling device as claimed in claim 1; the device carrier including a main body and at least one compartment; and the compartment being a recess formed on the main body for each holding one rolling device therein.

17. The package for rolling device as claimed in claim 16, wherein the main body of the device carrier can be a long belt or a tray in shape.

18. The package for rolling device as claimed in claim 17, further comprising a cover for covering onto the at least one compartment.

19. A rolling module, comprising at least one rolling device as claimed in claim 1 and an external object; and the rolling device being coupled to the external object.

20. The rolling module as claimed in claim 19, wherein the external object can be configured as a bar-shaped member, a carrier, an axle, a tray-like member, a rail, a slide rail, a leg post, a wheel supporting post, a wheel frame, a supporting stand, a board, a case, a printed circuit board (PCB) or a cover.

21. The rolling module as claimed in claim 19, wherein the external object is further connected to another object, such that the other object is carried by the external object and can be rolled or slid via the external object that has the rolling devices coupled thereto.

22. The package for rolling device as claimed in claim 16, wherein the rolling device is first removed from the compartment of the device carrier and positioned on the external object using an automatic picker; and is then heated and welded to the external object to be fixedly connected to the external object.

23. The rolling device as claimed in claim 1, wherein the rolling device is subjected to a force applied thereto by a pressing device, such that the coupling section of the rolling device is deformed under the force or the external object is pressed and deformed by the coupling section of the rolling device that is subjected to the force applied by the pressing device, bringing the rolling device to autonomously associate with part of a material of the external object.

* * * * *